Patented Jan. 7, 1941

2,227,834

UNITED STATES PATENT OFFICE 2,227,834

MIXTURES OF VAT DYESTUFFS AND PROCESS OF PRODUCING GREEN DYEINGS THEREWITH

Filip Kačer, Mannheim, and Joachim Mueller and Heinrich Neresheimer, Ludwigshafen-on-the-Rhine, Germany, assignors to General Aniline & Film Corporation, a corporation of Delaware No Drawing. Application August 8, 1939, Serial No. 289,000. In Germany August 17, 1938

7 Claims. (Cl. 8—28)

The present invention relates to green dyeings from the vat and to compositions of vat dyestuffs therefor.

In dyeings obtained with mixtures of vat dyestuffs it is often found that the component less fast to light exerts an unfavorable influence on the fastness to light of the component more fast to light and consequently of the mixed dyeing.

Thus for example dyeings with mixtures of green dyestuffs of the dialkoxydibenzanthrone series and $\mu,\mu$-diphenyl-1(S)2.5(S).6-anthraquinonedithiazole have poor fastness to light because not only does the yellow component fade but also the green dyestuff in the mixture is destroyed to a great extent at the same time.

We have now found that dyeings with mixtures of green vat dyestuffs of the dialkoxydibenzanthrone series and the dithiazoles obtainable by the condensation of 1-mercapto-2-aminoanthraquinone with terephthaloyl dihalides or halogenterephthaloyl dihalides prepared, for instance, according to the process of U. S. Patent 1,459,536 have a very good fastness to light in contrast to dyeings made with the above-mentioned mixtures. For example they possess a high fastness to light when dyed on cotton or regenerated cellulose. The dyestuffs may be mixed beforehand, or in the dyeing bath.

The following examples will further illustrate how the said invention may be carried out in practice, but the invention is not restricted to these examples. The parts are by weight.

Example 1

100 parts of the yellow vat dyestuff described in Example 1 of U. S. Patent 1,459,536 are intimately mixed with 23 parts of Bz2.Bz2'-dimethoxydibenzanthrone. The mixture dyes cotton from a vat at 60° C. yellowish green shades very fast to light.

Example 2

67 parts of the yellow vat dyestuff used in Example 1 are intimately mixed with 33 parts of the green vat dyestuff obtainable by grominating Bz2.Bz2'-dimethoxydibenzanthrone for example according to Example 1 of the U. S. Patent 1,505,912. By dyeing cotton there are obtained therewith bright yellowish green dyeings which are distinguished by a high fastness to light.

Example 3

100 parts of the dithiazole dyestuff obtained from 1-mercapto-2-amino-anthraquinone and monochlor-terephthaloyl dichloride are intimately mixed in a finely divided form with 46 parts of finely divided Bz2.Bz2'-dimethoxydibenzanthrone. The mixture yields on cotton especially clear yellowish green dyeings of very good fastness.

Example 4

42 parts of the yellow vat dyestuff described in Example 1 of U. S. Patent 1,459,536 are intimately mixed with 58 parts of Bz2.Bz2'-dimethoxydibenzanthrone. The mixture dyes cotton yellowish green shades very fast to light from a vat at 60° C.

Example 5

33 parts of the yellow dyestuff employed in Example 1 are intimately mixed with 67 parts of a brominated Bz2.Bz2'-dimethoxydibenzanthrone (prepared according to Example 1 of U. S. Patent 1,505,912). The mixture dyes cotton vivid yellowish green shades of very good fastness to light.

Example 6

76 parts of the yellow vat dyestuff prepared from 1-mercapto-2-aminoanthraquinone and monochlor-terephthaloyl dichloride according to the process described in U. S. Patent 1,459,536 are intimately mixed with 24 parts of finely divided Bz2.Bz2'-dimethoxydibenzanthrone. The mixture dyes cotton very clear yellowish green shades of very good fastness properties.

What we claim is:

1. The process of producing green dyeings fast to light, which comprises dyeing vegetable fibers with a dialkoxydibenzanthrone vat dyestuff dyeing a green shade in conjunction with a yellow dyestuff of the general formula:

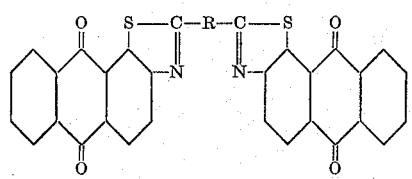

wherein R stands for a radical selected from the group consisting of unsubstituted and halogen substituted benzene radicals.

2. The process of producing green dyeings fast to light, which comprises dyeing vegetable fibers with a Bz2.Bz2'-dimethoxydibenzanthrone dyeing a green shade in conjunction with a yellow dyestuff of the general formula:

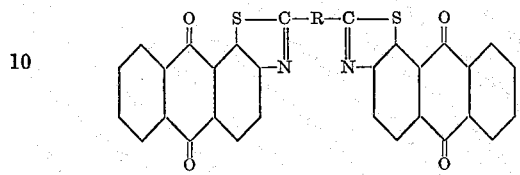

wherein R stands for a radical selected from the group consisting of unsubstituted and halogen substituted benzene radicals.

3. A composition of vat dyestuffs dyeing vegetable fibers clear green shades fast to light comprising a dialkoxydibenzanthrone vat dyestuff dyeing a green shade and a thiazol vat dyestuff of the general formula:

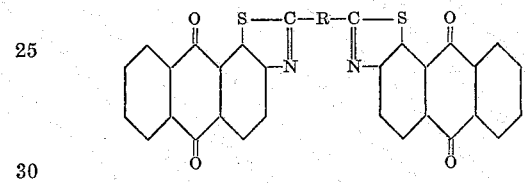

wherein R stands for a radical selected from the group consisting of unsubstituted and halogen substituted benzene radicals.

4. A composition of vat dyestuffs dyeing vegetable fibers clear green shades fast to light comprising a Bz2.Bz2'-dimethoxydibenzanthrone vat dyestuff dyeing a green shade and a thiazol vat dyestuff of the general formula:

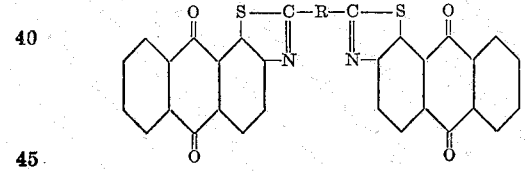

wherein R stands for a radical selected from the group consisting of unsubstituted and halogen substituted benzene radicals.

5. A composition of vat dyestuffs dyeing vegetable fibers clear green shades fast to light comprising Bz2.Bz2'-dimethoxy-dibenzanthrone and the thiazol vat dyestuffs of the formula:

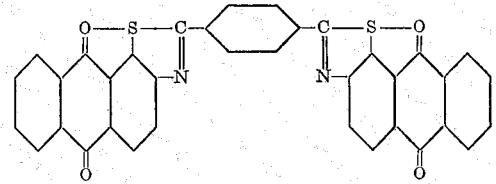

6. A composition of vat dyestuffs dyeing vegetable fibers clear green shades fast to light comprising a brominated Bz2.Bz2'-dimethoxydibenzanthrone and the thiazol vat dyestuff of the formula:

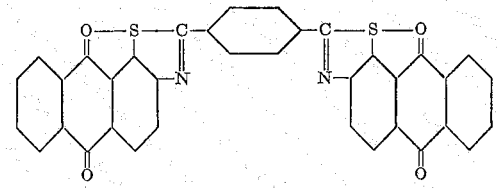

7. A composition of vat dyestuffs dyeing vegetable fibers clear green shades fast to light comprising Bz2.Bz2'-dimethoxy-dibenzanthrone and the thiazol vat dyestuff of the formula:

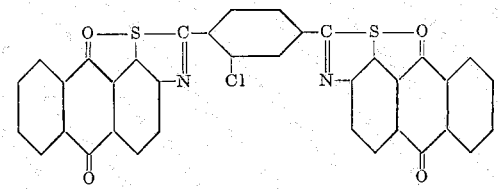

FILIP KAČER.
JOACHIM MUELLER.
HEINRICH NERESHEIMER.